No. 621,671.  
G. W. HINMAN.  
BARREL.  
(Application filed Jan. 28, 1898.)  
Patented Mar. 21, 1899.
(No Model.)  
2 Sheets—Sheet 1.
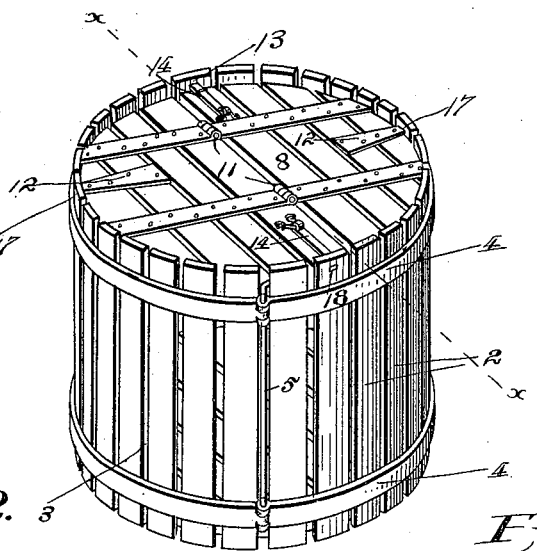
Fig. 1.
Fig. 2.
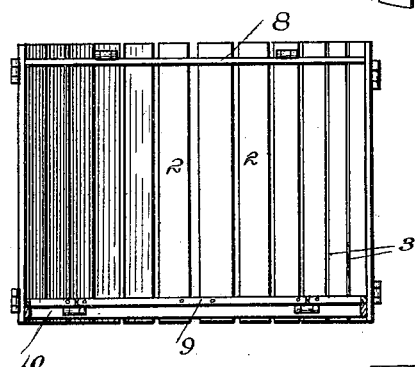
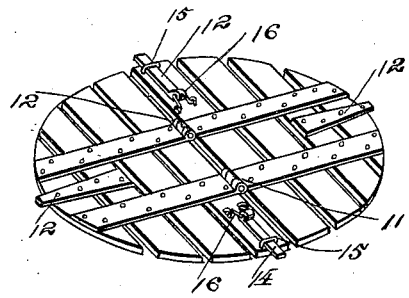
Fig. 3.
Fig. 4.
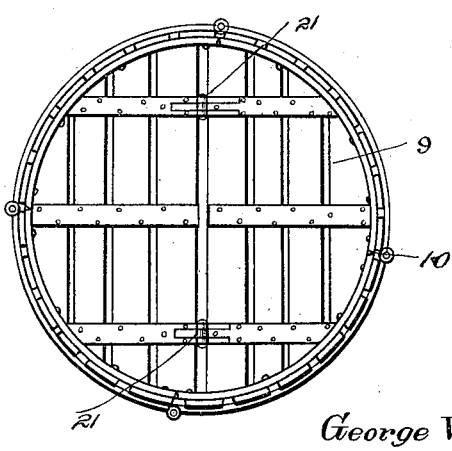
Witnesses  
C. N. Walker  
H. L. Ames
Inventor  
George W. Hinman.  
by V. D. Stockbridge  
his Attorney.
THE NORRIS PETERS CO., PHOTO-LITHO., WASHINGTON, D. C.

No. 621,671. Patented Mar. 21, 1899.
G. W. HINMAN.
BARREL.
(Application filed Jan. 28, 1898.)
(No Model.) 2 Sheets—Sheet 2.

Witnesses
C. N. Walker
H. L. Amer

Inventor
George W. Hinman
by V. D. Stockbridge
his Attorney

UNITED STATES PATENT OFFICE.

GEORGE W. HINMAN, OF LAKE CHARLES, LOUISIANA.

BARREL.

SPECIFICATION forming part of Letters Patent No. 621,671, dated March 21, 1899.

Application filed January 28, 1898. Serial No. 668,347. (No model.)

*To all whom it may concern:*

Be it known that I, GEORGE W. HINMAN, a citizen of the United States, residing at Lake Charles, in the parish of Calcasieu and State of Louisiana, have invented certain new and useful Improvements in Barrels; and I do hereby declare the following to be a full, clear, and exact description of the invention, such as will enable others skilled in the art to which it appertains to make and use the same.

This invention relates to a collapsible receptacle for conveying vegetables and fruits from one point to another; and it consists, essentially, of a round body or barrel composed of a series of slats or staves secured to bands or hoops which are hinged at regular intervals and also provided with top and bottom heads adapted to be folded and one of which has detachable securing devices in connection therewith.

The invention further consists of the details of construction and arrangement of the several parts, which will be more fully hereinafter described and claimed.

The object of the invention is to reduce the cost of transporting devices for vegetables and fruits and put them up in such shape that they may be easily returned to the shipper in compact form or stored in a small space when not in use, as well as to assist in the preservation of the vegetables or fruits therein contained by means of the establishment of ventilating means, the parts being simple and effective in their construction and operation, strong and durable, and comparatively inexpensive in the cost of manufacture.

Figure 5:
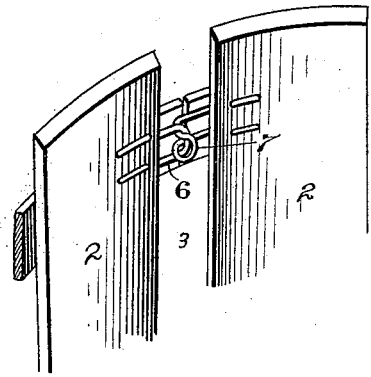
Figure 6:
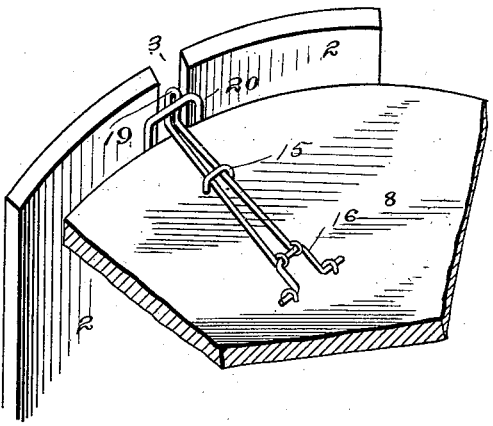
Figure 7:
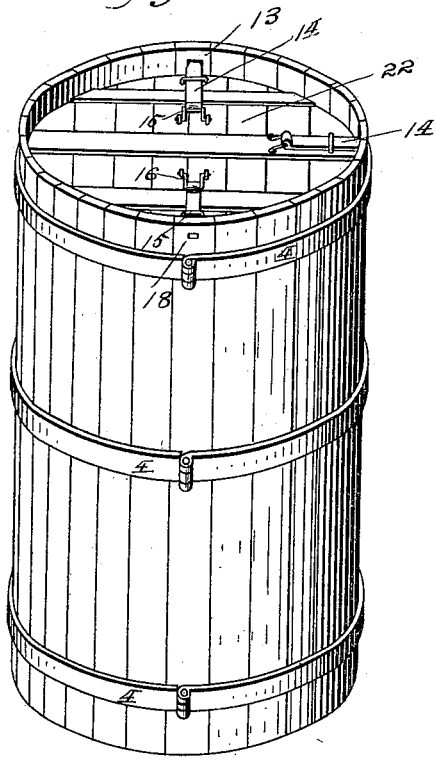
Figure 8:
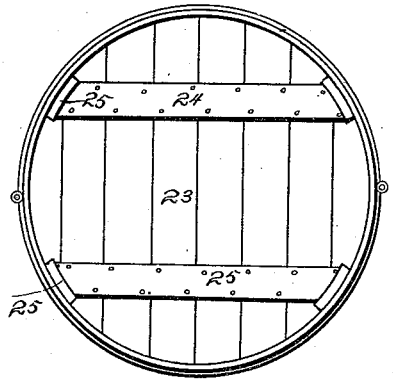

In the accompanying drawings, Figure 1 is a perspective view of the device embodying the invention. Fig. 2 is a transverse vertical section on a line *x x* of Fig. 1. Fig. 3 is a detail perspective view of one of the heads, showing the fastening devices therefor. Fig. 4 is a bottom plan view of the device shown in Fig. 1. Fig. 5 is a detail perspective view of the opposite portions of a band or hoop, showing the form of construction of the connecting-hinge. Fig. 6 is a detail perspective view of a portion of the body of the device, together with a part of the head, showing a modified form of fastening. Fig. 7 is a detail perspective view of a modified form of body, illustrating the slats closely arranged. Fig. 8 is a bottom plan view of the device shown by Fig. 7.

Referring to the drawings, wherein similar numerals of reference are employed to indicate corresponding parts in the several views, the numeral 1 designates a body composed of a series of slats or staves 2, which are preferably arranged to have an intervening space 3 for ventilating purposes; but, as shown by Fig. 7, it will be seen that the said slats or staves may be closely arranged, if desired. The said slats or staves 2 are secured to bands or hoops 4, and in setting up the body a wheel with a metallic-faced periphery and corresponding to the size of the body is placed within the latter to clench the nails or securing devices driven through the said bands or hoops and the slats or staves. At regular intervals the bands or hoops 4 are connected by hinged joints, and, as shown in Fig. 1, the ends of the said bands or hoops on one side are provided with double knuckles and a recess, and the companion ends engaging the same are formed with a single knuckle, said knuckles being properly fitted to each other and having a pintle 5 passed therethrough. Said bands may be made either of metal or wood, and when made of wood they may be easily connected to form a hinge-joint, as shown in Fig. 5, wherein one end of one band or hoop carries a loop 6, and the companion end of the adjacent portion of the hoop or band is supplied with a hook 7 to engage the said loop. The device shown by Fig. 7 has the bands or hoops thereof connected similarly to the arrangement illustrated by Fig. 1, with the exception that more hoops are shown and the pintles are short. The pintles 5 are so arranged that they may be easily withdrawn in separating a section, if desired, for the purpose of transportation or return shipment.

All of the device, as shown, is provided with an upper head 8 and a lower head 9. In all of the forms except that shown by Fig. 7 the lower portions of the bodies on the inner sides have rims 10, upon which the bottom head 9 rests, the said rims being made in sections and separated at the joints of the body. As shown by the construction in Figs. 1, 2, and 3, the head is made sectional and hinged at the center, as at 11, being composed of a series of slats and also having rigid locking-tongues 12 projecting from opposite points thereof, which are adapted to engage slotted keepers 17 on adjacent portions of the body to form a fastening for one side of the head, and at regular intervals between the said tongues the head has slide-locks 14, which are movable in guides 15, the said locks consisting of strips of metal connected at their rear ends to crank-links 16, movably mounted on the head. The said slide-locks engage other slotted keepers 18, secured on an adjacent portion of the body, and wherever these keepers are located on the body the slats supporting the same are formed with slots to receive the projecting parts, as at 18.

In Fig. 6 a slight modification of the slide-lock is shown and is illustrated as being made entirely of wire, having in this instance an upturned outer end 19, which is adapted to take under and bear against a vertically-disposed staple 20, held by an adjacent portion of the body. In this latter instance the upper head is also made up of separable sections or may be hinged, and one portion thereof is held under a suitable fastening or hinging device, while the opposite portion has wire slide-locks thereon. The bottom head, with the exception of the structure shown by Figs. 7 and 8, rests against the inner rim, hereinbefore set forth; but, as shown in Fig. 4, the bottom head of the device illustrated by Fig. 1 is hinged, as at 21, and is also provided with intermediate cross braces or strips for tying the slats together and to preserve a regularity of space between the same. The bottom head might also be continuous or unbroken in its contour and used in connection with the device without departing from the nature or spirit of the invention, and this is clearly illustrated in the modified form of construction shown by Fig. 7, wherein both the bottom and the top heads are slatted and not foldable. The same form of slide-lock heretofore described is employed in connection with the head 22 in this instance, and in this device also the slats or staves are closely arranged, as previously noted, showing that a foldable barrel-body can be constructed in accordance with the invention without the ventilating-openings, if so desired. The bottom head 23 has secured thereto metallic strips 24, which are adapted to be turned under downwardly-projecting hooks 25, secured to the lower portion of the body, and in removing the bottom head in this instance, as well as where the inside rim is employed, it is moved upwardly through the body of the barrel away from the resistance offered by the several securing features of the opposite movement.

The preferred form of the device of course embodies the ventilating-spaces between the slats both in the body and the upper and lower heads, and the size of these spaces will be proportionate to the vegetables or fruits placed within the receptacle. Of course where large vegetables are packed in the body the latter may have ventilating-spaces of increased dimension, and, conversely, where small vegetables or fruits are shipped in the improved device the ventilating-spaces will be proportionately smaller.

In shipping vegetables or fruits in the improved device the bottom head is first placed in position and the vegetables or fruits placed therein. After the body is filled sufficiently the upper head is secured in position, and the receptacle and its contents are ready for shipment. When the device is returned to the shipper, the body is folded by either disconnecting the several sections thereof or pressing said sections closely together, and the heads are conveniently arranged in connection with the said collapsed body. If the heads are of a foldable nature, their extent may be reduced, as will be readily understood, or if they are solid, as shown by Figs. 7 and 8, they will be attached to the collapsed body, and thereby materially reduce the space occupied ordinarily by the common form of barrel or circular crate. While the first or primary expense of putting up a device of this character may be greater than the construction of the ordinary barrel or circular crate, the convenience and continuous use of the same will in the long run greatly reduce the expense of shipping cases or devices, in view of the fact that the ordinary barrels or circular crates are seldom if ever returned, and are therefore almost invariably a total loss to the shipper. In addition in order to provide a barrel with ventilating-apertures it is necessary to cut openings in the staves at various points, thereby materially weakening the same with the inconvenience incidental to the formation of the said openings. It is also intended to at times use the barrel without the collapsible or additional features of construction heretofore set forth and which is not intended to be returned to the sender. In this form of the barrel it will be reduced in vertical extent, and between the several staves ventilating-spaces will be formed.

Numerous advantages will appear from time to time to those using the device in any of its forms other than those set forth, and it is obviously apparent that many minor changes in the proportions, dimensions, and details of construction and arrangement of the several parts might be made and substituted for those shown and described without in the least departing from the nature or spirit of the invention.

Having thus described the invention, what is claimed as new is—

1. In a shipping barrel or crate of the character specified, the combination with a collapsible body having keepers in its upper portion, a lower removable head, and an upper removable divided head having fixed and sliding locking-bars on each part thereof, the sliding locking-bars being secured to the parts of the head by pivoted crank-links, substantially as described.

2. In a shipping barrel or crate, the combination of a collapsible body having keepers at the inner upper portion thereof, a lower and an upper divided head having slide-locks on each part thereof connected to crank-links, the said slide-locks being adapted to engage the said keepers, substantially as described.

3. In a shipping barrel or crate of the character specified, the combination with a collapsible body, of a removable divided bottom, the parts of which are hinged together, a divided collapsible inner rim for holding said bottom against outward movement, and a removable and divided upper head having locking-bars on each part thereof, a portion of said locking devices being laterally movable to engage keepers on the barrel and being connected with the head by means of pivoted crank-links, substantially as described.

In testimony whereof I affix my signature in presence of two witnesses.

GEORGE W. HINMAN.

Witnesses:
M. D. ANDRUS,
J. C. VALVERDE.